United States Patent [19]

Lyons

[11] 4,009,147

[45] Feb. 22, 1977

[54] COMPOSITION OF ANTIOXIDANTS OF REDUCED VOLATILITY

[75] Inventor: Bernard J. Lyons, Atherton, Calif.

[73] Assignee: Raychem Corporation, Menlo Park, Calif.

[22] Filed: July 7, 1975

[21] Appl. No.: 593,643

Related U.S. Application Data

[60] Division of Ser. No. 481,740, June 21, 1974, Pat. No. 3,986,981, which is a continuation-in-part of Ser. No. 150,831, June 7, 1971, abandoned, which is a continuation-in-part of Ser. No. 660,198, Aug. 14, 1967, abandoned.

[52] U.S. Cl. ................. 260/45.95 B; 260/45.95 C
[51] Int. Cl.$^2$ ..................... C08K 5/37; C08K 5/13
[58] Field of Search ............ 260/45.95 B, 45.95 C, 260/618 C, 609 F, 619 A

[56] References Cited

UNITED STATES PATENTS

| | | | |
|---|---|---|---|
| 2,239,534 | 4/1941 | Mikesa | 260/609 F |
| 2,905,737 | 9/1959 | Webb | 260/45.95 B |
| 2,956,982 | 10/1960 | McCall et al. | 260/45.95 C |
| 3,082,187 | 3/1963 | Fuchsman | 260/45.95 C |
| 3,450,671 | 6/1969 | Thalstrup | 260/45.95 B |
| 3,843,600 | 10/1974 | Robin | 260/45.95 C |
| 3,856,728 | 12/1974 | Akramoff | 260/45.95 B |

OTHER PUBLICATIONS

Wire and Wire Products—36 (4) p. 465 (1961) article by Tarbox.

*Primary Examiner*—V. P. Hoke
*Attorney, Agent, or Firm*—Lyon & Lyon

[57] ABSTRACT

For incorporation in normally oxidizable polymers, polymeric antioxidants characterized by repeating hindered bisphenolic units, the average number of said units per polymeric chain in said composition being from about 2 to 10, preferably about 2 to 7, most preferably about 2 to 4. The antioxidants are prepared by oxidative coupling of appropriate bisphenols, as by reaction with a ferricyanide coupling agent. Polymer-antioxidant combinations formed according to the invention have excellent high temperature oxidative stability, high resistance to polymer damage by massive doses of ionizing radiation and the antioxidant does not release significant amounts of condensable species when subjected simultaneously to conditions of high vacuum and elevated temperatures.

47 Claims, No Drawings

COMPOSITION OF ANTIOXIDANTS OF REDUCED VOLATILITY

CROSS-REFERENCE TO RELATED APPLICATIONS

This is a division of my copending application Ser. No. 3,986,981 481,740 filed June 21, 1974, now U.S. Pat. No. 3,986,981 which is a continuation-in-part of my copending application Ser. No. 150,831 filed June 7, 1971 (now abandoned), which was in turn a continuation-in-part of my application Ser. No. 660,198, filed Aug. 14, 1967 (now abandoned).

BACKGROUND OF THE INVENTION

Olefin polymers are particularly subject to severe deterioration from the oxidative action of air at elevated temperatures. They are also vulnerable to degradation by the action of ionizing radiation when large amounts of such radiation are deposited into the polymer, e.g., amounts of $5 \times 10^{10}$ ergs per gram and higher. Oxidative deterioration at elevated temperatures is manifested by surface crazing, then cracking and ultimately a complete embrittlement.

It is known that small amounts of some antioxidants, e.g., 4,4'-thiobis(6-5-butyl-m-cresol), can be added to polyolefins and more particularly to polyethylenes to prevent or impede these degradative effects without the contribution of color to the polymer. However, such conventional antioxidants are not effective under conditions of high vacuum and/or high temperatures since with time the antioxidant volatilizes away from the substance into which it was incorporated.

Until recently, the undesirable of such antioxidants in a crosslinked polyolefin composition was undersirable primarily because of the reduction in oxidative stability which occurred as the antioxidant volatilized away.

The use of crosslinked polyolefin materials in space vehicles has brought to light a still more important disadvantage of these antioxidant materials. When used in a space vehicle, a crosslinked polyolefin material, employed for example in the form of electrical wire installation on solar panel wiring or in front of tubing, may be exposed to solar radiation in the hard vacuum of space such that the polyolefin may be heated to temperatures as high as 125° to 150° C. Under such conditions, most of the prior art antioxidants, such as those previously mentioned, will be volatilized away. Since optical systems in the space vehicle, shielded to solar radiation, may be at a relatively low temperature, perhaps 10° C., the gas formed from the antioxidant will condense on the optical system thereby adversely effecting its transmitive and reflective optical characteristics. Furthermore, the heated polyolefin with its antioxidant-radiation protectant volatilized away is now vulnerable to radiolytic degradation such as that which may be caused by energetic solar protons.

It is also known that certain polymeric involatile materials may be used as antioxidants. Thus, certain phenolformaldehyde polymers may be used as antioxidants. Also, bisphenols and triphenols such as those described in U.S. Pat. No. 3,247,262 may be used to protect against oxidative degradation. The bis and triphenols are still volatile, however. The phenol-formaldehyde resins, which have lower volatility, have disadvantages including thermosetting characteristics of the phenol-formaldehyde antioxidant, choice of precursors on the basis of synthetic convenience rather than antioxidant capability and a pronounced tendency to impart coloration to polymers to which they are added.

U.S. Pat. No. 3,133,899 to Kwiatek proposes the copper chloride-catalyzed oxidative polymerization of a thiobisphenol to form polymeric ethers of formula

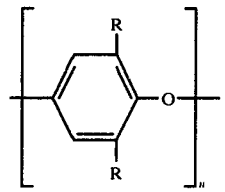

the thiobisphenols employed having the formula

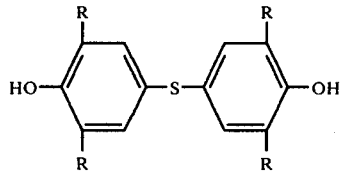

wherein at least one R on each phenolic group is alkyl, the other being alkyl or hydrogen, alkyl in every case preferably having 1 to 3 carbon atoms. Should those R groups be of more than 3 carbon atoms, the work of Hay et al. in J.A.C.S. 81,6335 (1959) with oxidative coupling of 2,6-disubstituted phenols would suggest that the Kwiatek procedure would yield diphenoquinones as the sole product. Such materials form undesirable color bodies when blended in olefinic polymers and the like.

Braus et al., in U.S. Pat. No. 3,462,375 disclose antioxidant compositions of formula

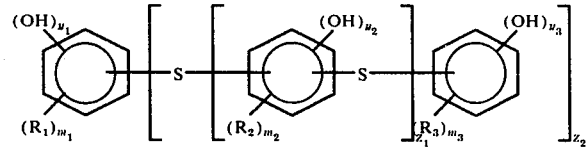

but the values assigned $Z_{1-2}$, $Y_{1-3}$ and $M_{1-3}$ make clear that it is a phenol-substituted benzene compound rather than a bisphenolic polymer which is proposed. Again, in U.S. Pat. Nos. 3,377,333 and 3,044,960, respectively, to Ciesielski et al. and Morway et al alkyl-substituted thiophenolic polymers are disclosed whose repeating units are, e.g.,

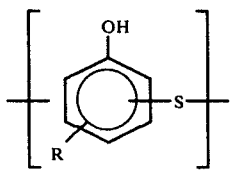

Such polymers are distinguished from the bisphenolic polymers of the present invention by, inter alia, the characteristic lack in the former of direct carbon-carbon bonding between the phenolic rings of adjoining thiobisphenolic repeating units.

SUMMARY OF THE INVENTION

According to this invention, there are provided antioxidants and antioxidant-containing polymer compositions, the antioxidants having the formula

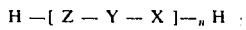

wherein $n$ is from about 2 to 12 and wherein for each repeat unit, Z and X are independently selected from the group consisting of

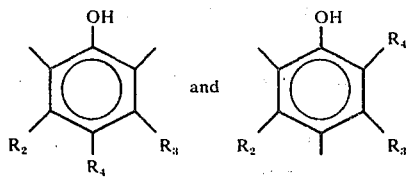

$R_2$ and $R_3$ being independently hydrogen or alkyl, cycloalkyl, aryl or alkaryl groups having from 1 to 8 carbon atoms, $R_4$ being alkyl of 4 to 8 carbon atoms, preferably tertiary alkyl and Y is selected from the group consisting of sulfur, methylene and butylidene. It has been found that the controlled oxidative coupling reaction of certain bisphenolic compounds will produce a non-volatile compound which is surprisingly effective as an antioxidant. The polymeric antioxidants of the present invention are generally colorless or only very slightly colored and thus may be used at relatively high levels, i.e., 1% in polymers such as polyolefins without causing undue coloration in the finished fabricated article. The antioxidants of the invention are resistant to the effects of high temperature and high vacuum and are capable of imparting radiation resistance to polymeric compounds.

DESCRIPTION OF THE PREFERRED EMBODIMENTS

Low molecular weight phenolic compounds suitable as precursors in this invention have the following formulae:

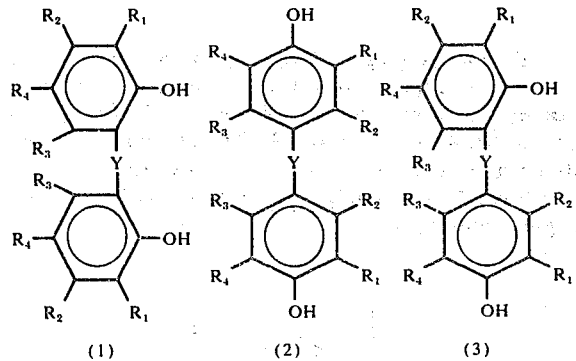

wherein $R_1$ is hydrogen; $R_2$ and $R_3$ are independently selected from the group consisting of hydrogen or alkyl, cycloalkyl, aryl or alkaryl groups having from 1 to 8 carbon atoms, $R_4$ is an alkyl group having from 4 to 8 carbon atoms and Y is selected from the group consisting of sulfur, methylene or butylidene. $R_4$ is preferably tertiary alkyl, i.e., at least one carbon atom is substituted only by carbon. Phenolic moieties whose valence bonds to Y are para to hydroxyl, such as compound (2) above are preferred from the standpoint of avoiding coloration of polymers in which the antioxidants of the invention are employed.

The low molecular weight bisphenolic compounds suitable for use as precursors in this invention may be selected from a wide variety of available phenolic compounds which have antioxidant properties, e.g., 4,4' methylene bis (6-t-butyl-m-cresol); 4,4' thiobis (6-t-butyl-m-cresol); 4,4' butylidene bis(6-t-butyl-m-cresol); 2,2'-methylene bis (6-t-butyl-m-cresol); 2,2'-thiobis (6-t-butyl-m-cresol); 2,2'-butylidene-bis (6-t-butyl-m-cresol). These and other bisphenolic precursors suitable in this invention may be conventionally prepared by, e.g., reaction of one or more phenolic compounds with sulfur mono- or dichloride; by the reaction of olefin and a suitable thiobisphenol in the presence of an alkylation catalyst, etc.

The precursor used to produce the antioxidants of the present invention must have available at least one unsubstituted ortho or para position relative to the phenolic hydroxyl groups. For example, in 4,4'-thiobis (6-t-butyl-m-cresol) there are two ortho positions unsubstituted.

Normally, oxidative coupling yields a mixture of molecular species of varying length (e.g., $n$ ranges from 2 to about 12), $n$ average for the mixture being from about 2 to about 10, preferably from about 2 to about 7, and most preferably from about 2 to about 4.

The antioxidants of the present invention are useful in polymers generally and particularly olefin polymers and copolymers such as polyethylene, polypropylene, polyisoprene, ethylene-propylene copolymers, acrylic polymers such as polyethyl acrylate and other polymers such as polyamides, Teflon, etc., which are known to be stabilized by hindered phenols. The antioxidant can be incorporated in effective amounts into the polymer by conventional methods such as hot milling, mixing in a Banbury mixer, extrusion, etc. Normally, from about 1 to about 10 percent by weight of antioxidant is employed, based upon the weight of the normally oxidizable polymer.

The final polymeric systems containing these polymeric stabilizers are particularly suitable where it is desired to crosslink by the use of ionizing radiation because these stabilizers do not appreciably inhibit crosslinking as compared with the low molecular weight precursors and are more resistant to radiation damage.

The coupling reactions suitable for use in this invention include oxidative coupling of the bisphenols by oxidizing agents such as $K_3Fe(CN)_6$, chromic acid, organic peroxides, manganese dioxide, potassium permanganate, potassium dichromate and electrolytic oxidation. Coupling agents which do not form molecular oxygen upon decomposition are employed to avoid formation of undesirable by-products. Coupling may take place in situ although it is preferred to perform the coupling reaction under conditions such that the structure and nature of the resulting antioxidant can be controlled to prevent undesirable side reactions.

It has been found that the antioxidant polymer of this invention is particularly effective if it is formed using a ferricyanide coupling agent, e.g., $K_3Fe(CN)_6$. The increased effectiveness obtained by this method may be due to the fact that undesirable by-products are substantially reduced. Thus, other coupling systems may produce by-products which detract from the effectiveness of the antioxidant. In any event, the antioxidants prepared with $K_3Fe(CH)_6$ do exhibit increased effectiveness when compared with antioxidants of this invention prepared from the same precursors with other oxidizing agents.

Any suitable ferricyanide may be used in the coupling reaction, e.g., $K_3Fe(CN)_6$, $Na_3Fe(CN)_6$, etc. The molar ratios of ferricyanide to bisphenol may vary from about 0.5 to 2 with the preferred ratio being about 1.33 to 1. Increasing the ratio of ferricyanide to bisphenol will increase the molecular weight of the antioxidant. At a ratio of 1.33 to 1, the resulting polymeric antioxidant will contain an average of about 3 bisphenol units. The molecular weight can also be controlled by controlling the reaction period, a shorter reaction time resulting in lower molecular weights.

The ferricyanide may be added to the bisphenol as a water solution. Addition may be dropwise or the entire water solution may be added at once to the bisphenol dissolved in an organic solvent.

It is important to maintain the pH of the reaction solution near 7. Thus, the pH may vary from about 5 to 9 without any substantial adverse effect. In order to maintain the pH at the desired level, an acid acceptor or buffer such as sodium carbonate or bicarbonate can be used. In general, any acid acceptor which will maintain the pH near 7 may be used.

The reaction temperature should be maintained at as low a level as possible. Thus the temperature should be maintained below about 80° C. and preferably below about 50° C. If the temperature is allowed to exceed 80° C., discoloration of the polymer and decreased antioxidant effectiveness may result.

The oxidative coupling using an organic peroxide can be accomplished either in solution or in situ by adding the peroxide to a polymer containing an antioxidant precursor. Suitable peroxides include t-butyl perbenzoate, dicumyl peroxide, benzoyl peroxide, 2,5-dimethyl-2,5-bis(t-butyl-peroxy)hexane, 2,5-dimethyl-2,5-di(t-butyl-peroxy)hexyne-3,t-butyl-peroxy-isopropyl carbonate, etc.

Suitable solvents in which the coupling with organic peroxide can be carried out include cyclohexane, benzene, toluene, xylene, chlorobenzene, etc. In general, the preferred solvent with peroxides is xylene, because of its lower vapor pressure at the convenient decomposition temperature of the peroxide. Benzene is preferred when a ferricyanide coupling agent is used.

The molar ratio of peroxide to the antioxidant precursor should be maintained between a lower limit of about 0.5 and an upper limit of about 2 to 1 with a ratio of about 0.9 to 1 being preferred.

The present invention is further illustrated by the following examples in which parts are by weight unless otherwise indicated.

The effectiveness of the antioxidant was measured by temperature programmed differential thermal analysis in oxygen. In this technique, which has been described by V. E. Althouse (Am. Chem. Soc., Div. Polymer Chem. Preprints 4, (1), 256 (1963)), the temperature of a polymer sample containing a certain percentage of the antioxidant is increased at a uniform rate (in this case, 6¼° per minute) with a constant flow of oxygen, until an autocatalytic oxidation (accompanied by an exotherm) occurs. The temperature at which the oxidation exotherm appears has been shown to be proportional to the logarithm of the concentration of an antioxidant and to indicate to a degree its effectiveness as an antioxidant.

The temperature at which an oxidative exotherm occurred (hereafter known as the DTA temperature) was measured by the above procedure on the polymer samples as prepared, and also after the samples has been maintained at 200° C. for 66 hours in a slow stream of argon. It is found that lower molecular weight antioxidants, such as 4,4'-thiobis (6-t-butyl-m-cresol), are substantially volatilized out of the polymer sample after such an aging procedure. Consequently, the DTA temperature of such samples is drastically reduced by this treatment. On the other hand, the involatile antioxidants prepared according to the practice of this invention show very little change in DTA temperature after such a treatment.

Hence, the difference in DTA temperature before and after aging in argon affords a sensitive means of measuring volatility of an antioxidant. Furthermore, because the temperature is logarithmically related to antioxidant concentration, a small difference in temperature can reflect a large difference in antioxidant concentration as shown in the table below.

| Relationship Between DTA Temperature and Concentration of 4,4'-thiobis(6-t-butyl-m-cresol) | |
|---|---|
| Concentration % | Approximate DTA Temperature ° C. |
| .01 | 242 |
| 0.1 | 250 |
| 0.3 | 268 |
| 0.5 | 273 |
| 1.0 | 278 |
| 2.0 | 282 |

EXAMPLES 1-2

These examples illustrate formation of my polymeric antioxidants in situ. The antioxidant was formed by milling the bisphenol and peroxide into polyethylene and curing at 172° C. Both mixes contained 1 part per hundred of t-butyl perbenzoate which was equivalent to 1.04 mol per mol of bisphenol used. Comparative runs were made using the same formula except that the peroxide was omitted. The resulting compositions were compared by a differential thermal analysis comprising heating a reference and the antioxidant-containing sample at the same rate. Volatility of the antioxidant was indicated by comparing the DTA values before and after heat aging. The results are set forth in Table I.

TABLE I

| | | | Color | | DTA Performance ° C. | | | |
| | Antioxidant | | Before | After | With Peroxide | | Without Peroxide | |
| Example | Type | p.h.r. | Cure | Cure | Unaged | Argon Aged | Unaged | Argon Aged |
| 1 | 4,4'-butylidene-bis(6-t-butyl-m-cresol) | 2.1 | White | White | 261.2 | 252.9 | 263.5 | 232.7 |
| 2 | 4,4'-thiobis(6-t- | 2.0 | White | Light | 285.7 | 284.1 | 281.6 | 266.1 |

TABLE I-continued

| Example | Antioxidant Type | p.h.r. | Color Before Cure | Color After Cure | DTA Performance °C With Peroxide Unaged | DTA Performance °C With Peroxide Argon Aged | DTA Performance °C Without Peroxide Unaged | DTA Performance °C Without Peroxide Argon Aged |
|---|---|---|---|---|---|---|---|---|
| | butyl-m-cresol | | | Yellow | | | | |

EXAMPLES 3–22

The method of Example 1 was repeated using various peroxides and 4,4'-thiobis(6-butyl-m-cresol). The results are set forth in Table II. It is seen that maximum retention of performance after aging in argon results when the weight ratio of peroxide to antioxidant precursor is between 1 and 2 to 1, the actual optimum value varying with the peroxide used.

TABLE II

| Example | Peroxide Type | p.h.r. | Cure Time at 340° F. (min.) | DTA Temperatures Unaged | DTA Temperatures Argon Aged |
|---|---|---|---|---|---|
| 3 | No peroxide | — | 10 | 281.6 | 260.3 |
| 4 | Lupersol 101[1] | 0.7 | 10 | 285.2 | 277.1 |
| 5 | Lupersol 101 | .8 | 10 | 285.4 | 281.3 |
| 6 | Lupersol 101 | .9 | 10 | 285.8 | 281.3 |
| 7 | Lupersol 101 | 1.0 | 10 | 286.1 | 281.6 |
| 8 | Lupersol 101 | 1.2 | 10 | 285.9 | 281.5 |
| 9 | Lupersol 101 | 1.4 | 10 | 285.4 | 282.2 |
| 10 | Lupersol 101 | 1.6 | 10 | 286.8 | 283.8 |
| 11 | Lupersol 101 | 0.4 | 10 | 283.5 | 274.7 |
| 12 | Lupersol 101 | 0.8 | 10 | 286.3 | 276.0 |
| 13 | Lupersol 101 | 1.6 | 10 | 285.7 | 281.2 |
| 14 | Lupersol 101 | 2.4 | 10 | 283.4 | 280.8 |
| 15 | Lupersol 130[2] | 0.4 | 20 | 283.6 | 263.4 |
| 16 | Lupersol 130 | 0.8 | 20 | 284.3 | 278.4 |
| 17 | Lupersol 130 | 1.2 | 20 | 284.8 | 281.0 |
| 18 | Lupersol 130 | 1.6 | 20 | 285.3 | 284.1 |
| 19 | Dicumylperoxide | 1.3 | 10 | 285.6 | 283.6 |
| 20 | Dicumylperoxide | 1.5 | 10 | 285.3 | 283.0 |
| 21 | Dicumylperoxide | 1.75 | 10 | 285.0 | 283.5 |
| 22 | Dicumylperoxide | 2.0 | 10 | 284.0 | 284.3 |

[1] 2,5-Dimethyl-2,5-bis(t-butyl peroxy)hexane
[2] 2,5-Dimethyl-2-5-di(t-butyl peroxy)hexane-3

EXAMPLES 23–26

These examples illustrate preparation of the polymeric antioxidant in a solvent. A mixture of 4,4'-thiobis(6-t-butyl-m-cresol) and di-t-butyl peroxide in xylene under nitrogen was heated in an autoclave and the product evaporated to dryness. The conditions are described in Table III. The molecular weight of the antioxidant polymer was determined by the freezing technique known as Beckman's method and set forth in Glasstone, Textbook of Physical Chemistry, 2 Md (1947), 646–47. Molecular weight measurements in this experiment were made on 5% solutions in benzene.

The resulting polymeric antioxidant was incorporated into polyethylene and the DTA exotherm temperature was determined

TABLE III

| Example | Thiobisphenol kg. | Concentration gms/100 mls | Temperature °C | Time Hrs. | Yield % | Molecular Weight | DTA Exotherm Temperature °C Unaged | DTA Exotherm Temperature °C Argon Aged |
|---|---|---|---|---|---|---|---|---|
| 23 | 0.108 | 14.5 | 155–160 | 2 | 105 | 876 | 287.5 | 283.2 |
| 24 | 4.0 | 16.2 | 160 | 6 | 101 | 880 | 287.9 | 286.8 |
| 25 | 15.0 | 35.8 | 160–167 | 3 | 101 | 1,287 | 283.5 | 285.1 |
| 26 | 0.324 | 43.9 | 160–163 | 3½ | 102 | 640 | 284.5 | 284.1 |

EXAMPLES 27–31

These examples illustrate the effect of pH on the polymer properties obtained using a ferricyanide to prepare the antioxidants. In Examples 27–31, the ferricyanide was dissolved in 80% of the water used and added dropwise over 3 hours to a mixture of 4,4'-thiobis(6-t-butyl-m-cresol), benzene, an acid acceptor, and the remaining water. Molecular weights of the product were determined according to the method of Example 23.

TABLE IV

| Example | Thiobisphenol g. | $K_3Fe(CN)_6$ g. | Type | pH | g. | Water mls. | Benzene mls. | Molecular Weight | Appearance |
|---|---|---|---|---|---|---|---|---|---|
| 27 | 100 | 90 | NaCH | 7–11 | 20 | 300 | 200 | 663 | Light green |
| 28 | 120 | 146 | NaCH | 7–11 | 30 | 400 | 200 | 860 | Green brown |
| 29 | 120 | 146 | $Na_2CO_3$ | 8–10 | 60 | 500 | 200 | 800 | Deep Yellow |
| 30 | 120 | 146 | $NaHCO_3$ | 6–8 | 42 | 500 | 200 | 900 | Light Yellow |
| 31 | 120* | 146 | $NaHCO_3$ | 6–8 | 42 | 500 | 200 | 944 | Very light yellow |

*The thiobisphenol used in this example had been recrystallized from benzene-cyclohexane.

EXAMPLES 32–39

The following examples illustrate the effect of varying reaction conditions on the molecular weight, color and DTA performance of the antioxidant. The reaction conditions set forth in Example 27 were followed except that in Examples 37, 38 and 39, the ferricyanide solution was added in one batch at the beginning of the reaction. All experiments used analytical reagent grade benzene except 39 which used a technical grade. Experiments 38 and 39 used technical grade ferricyanide while the others used analytical reagent grade ferricyanide. The molar ratio of ferricyanide to thiobisphenol in the above experiments is uniformly about 1.33 to 1. The results are set forth below in Table V.

values which were prepared in the form of 0.125 in i.d., 0.020 in thick tubing.

The time to crack on flexing was determined by heating the samples to the indicated temperature for the indicated time and bending them through 180° with cracking observed visually. The values in Table VI represent the average of the times to slight cracking and the times to serious cracking.

The elastic modulus was determined above the melting point of the polymer by statically loading strips of polymer and measuring the strain. The initial slope of the resulting stress-strain curve was taken as the elastic modulus.

These examples illustrate the marked advantage of polymeric antioxidants at high concentrations and elevated temperatures. At lower concentration, oxidation occurs so rapidly that the effect of volatilization is masked. At lower temperatures, volatilization is not a problem.

TABLE V

| Example | Thiobisphenol g. | Ferricyanide g. | NaHCO$_3$ g. | Benzene ml. | Water ml. | Temp. °C | Color | Molecular Weight | D.T.A. Performance Unaged °C. |
|---|---|---|---|---|---|---|---|---|---|
| 32 | 300 | 365 | 105 | 650 | 1250 | 15–30 | Lt. Yellow | 922 | 289.0 |
| 33 | 300 | 365 | 105 | 650 | 1250 | 50 | Yellow | 977 | 280.4 |
| 34 | 500 | 608 | 175 | 1080 | 2218 | 35 | Lt. Yellow | 937 | 288.6 |
| 35 | 1250 | 1520 | 437 | 2100 | 5000 | 35 | Lt. Yellow | 1000 | 288.5 |
| 36 | 300 | 365 | 105 | 650 | 1000 | 25 | Lt. Yellow | 955 | 289.5 |
| 37 | 1500 | 1824 | 520 | 2500 | 4500 | 35–50 | Lt. Yellow | | 289.3 |
| 38 | 300 | 365 | 105 | 650 | 1000 | 35 | Lt. Yellow | 924 | |
| 39 | 300 | 365 | 105 | 650 | 1000 | 35 | Lt. Yellow | | |

EXAMPLES 40–45

Polymeric antioxidants made according to the present invention were incorporated into polyethylene at various levels irradiated to 10 megarads, except the 2 p.h.r. level which was given a dose of 20 megarads. The irradiated products were evaluated for heat aging characteristics and modulus of elasticity at a variety of temperatures. The results are shown in Table VI and Table VII. The compositions in Table VI and Table VII were prepared in slab form, except for the 2 p.h.r.

TABLE VI

| | | Time to Crack on Flexing at 155° C and 175° C | | | | | | | | | |
|---|---|---|---|---|---|---|---|---|---|---|---|
| | Antioxidant | Concentration (p.h.r.) | | | | | | | | | |
| | | 0.063 | | 0.125 | | 0.25 | | 0.5 | | 1.0 | 2.0 |
| Example | Type | 155° | 175° | 155° | 175° | 155° | 175° | 155° | 175° | 155° | 175° | 200° |
| 40 | 4,4'-thiobis(6-t-butyl-m-cresol) | 71 | 29 | 144 | 41 | 271 | 79 | 623 | 172 | >600* | 320 | 78 |
| 41 | A | 71 | 30 | 154 | 48 | 293 | 94 | 752 | 220 | >600* | 490 | 130 |
| 42 | B | 69 | 29 | 160 | 50 | 374 | 86 | 793 | 217 | >600* | 580 | 162 |

Note: A was prepared from 4,4'-thiobis(6-t-butyl-m-cresol using di-t-butyl peroxide as shown in Example 23 while B was prepared using potassium ferricyanide as in Example 35.
*These tests were abandoned after all samples at the 1% level had withstood 600 hours at 155° C without cracking.

TABLE VII

| | Antioxidant | Modulus (p.s.i.) at 160° C. | | | | | |
|---|---|---|---|---|---|---|---|
| | | Concentration (p.h.r) | | | | | |
| Example | Type | 0.0 | 0.063 | 0.125 | 0.25 | 0.5 | 1.0 | 2.0 |
| 43 | 4,4'-thiobis(6-t- | 30 | — | 10 | 10 | 7 | 7 | 21 |
| 44 | A | — | — | 33 | 19 | 19 | 9 | 56 |
| 45 | B | — | — | 21 | 15 | 17 | 9 | 69 |

EXAMPLES 46–51

A further series of thiobisphenolic antioxidants were prepared as shown in Table VIII, following the procedure of Examples 27–31, supra. Molecular weight values reported are number average molecular weights determined by vapor phase osmometry.

TABLE VIII

| | Antioxidants Based on 4,4'-thiobis-(6-t-butyl-3-methylphenol)* | | | |
|---|---|---|---|---|
| Example | Potassium Ferricyanide (g.) | 4,4'-thiobis-(6-t-butyl-3-methylphenol) (g.) | Sodium Bicarbonate (g.) | Molecular Wt. |
| 46 | 906 | 660 | 246 | 1697 |
| 47 | 970 | 660 | 263 | 2393 |
| 48 | 810 | 660 | 220 | 1076 |

TABLE VIII-continued

| Example | Potassium Ferricyanide (g.) | Antioxidants Based on 4,4'-thiobis-(6-t-butyl-3-methylphenol)* 4,4'-thiobis-(6-t-butyl-3-methylphenol) (g.) | Sodium Bicarbonate (g.) | Molecular Wt. |
|---|---|---|---|---|
| 49a | 2040 | 1500 | 553 | 1360 |
| 49b | 2040 | 1500 | 553 | 1490 |
| 50 | 1930 | 1500 | 524 | 1189 |
| 51a | 2170 | 1500 | 590 | 1450 |
| 51b | 2170 | 1500 | 590 | 1869 |

*4,4'-thiobis-(6-t-butyl-3-methylphenol) is the same as 4,4'-thiobis-(6-t-butyl-m-cresol).

4,4,'-thiobis-(6-t-butyl-3-methylphenol) is the same as 4,4'-thiobis-(6-t-butyl-m-cresol).

The duplicate preparations 49a and 49b were combined together for testing (average molecular weight 1430) and labelled 49. Similarly 51a and 51b were combined, (M.W. 1660) and labelled 51.

The antioxidants shown in Table VIII were blended into a low density polyethylene (DFD 6040, Union Carbide Corp.) irradiated to various dose levels and the elastic modulus (Young's modulus) at 160° C measured. The samples irradiated to 20 mrads dose were hung in a circulating air oven at 185° C, and their room temperature elongation measured after various exposure times. One sample containing tetrakis [methylene 3-(3',5'-di-t-butyl-4'-hydroxyphenyl) propionate] methane (Irganox 1010) was included in these tests for comparison purposes. All antioxidants were incorporated into DFD 6040 (0.2 M.I.; 0.92 density) at the 2% w/w level.

EXAMPLES 52 – 57

Other oligomeric antioxidants were prepared from 4,4'-butylidene-bis(6-butyl-3-methylphenol) as in the previous example. Table X shows the recipes used in the preparation and the molecular weights of the products, determined as in Examples 46 – 51. Preparations were based on 1500 g. of the antioxidant starting material. 4700 ml. of deaerated water was used in each reaction to dissolve the salts. The compound 4,4'-butylidene-bis(6-t-butyl-3-methylphenol) is the same as 4,4'-butylidene-bis(6-t-butyl-m-cresol).

TABLE X

| Sample No. | Potassium Ferricyanide (g.) | Sodium Bicarbonate (g.) | Benzene (ml.) | Molecular Wt. |
|---|---|---|---|---|
| 52 | 1840 | 500 | 5400 | 1230 |
| 53 | 2040 | 553 | 5400 | 1790 |
| 54 | 1940 | 500 | 5400 | 1460 |
| 55 | 1840 | 500 | 5400 | 1240 |
| 56 | 1650 | 500 | 6500 | 1340 |
| 57 | 1750 | 500 | 6500 | 1610 |

Certain of the foregoing antioxidants were milled into polypropylene (Profax 6823; flow rate (g./10 min.), 0.4 (ASTM-D1238L); 0.903 density) and aged at 150° C in a air circulation oven. The results are given in Table XI. Some of these materials were also blended with distearyl pentaerylthritol diphosphite and blended into polyethylene containing a polyfunctional monomer (triallyl isocyanurate). The irradiated samples were aged at 175° C and the results are shown in Table XII.

TABLE IX

| Antioxidant | Mol. Wt. | Elastic Modulus at 160° C after | | | | Elongation at room temperature after days at 185° C | | | | |
|---|---|---|---|---|---|---|---|---|---|---|
| | | 10 | 20 | 40 | 60 mrads | 0 | 8 | 14 | 17 | 21 |
| 50 | 1190 | 5 | 13 | 40 | 63 | 560 | 290 | 230 | 105 | 60 |
| 49 | 1430 | 6 | 16 | 44 | 77 | 550 | 340 | 190 | 125 | 65 |
| 51 | 1660 | 5 | 16 | 47 | 81 | 540 | 360 | 180 | 110 | 30 |
| 47 | 2390 | 6 | 18 | 51 | 86 | 550 | 290 | 170 | 105 | 25 |
| Irganox 1010 | — | 7 | 18 | 48 | 73 | 520 | <20 | <20 | — | — |

TABLE XI

| | 1 | 2 | 3 | 4 | 5 | 6 | 7 | 8 |
|---|---|---|---|---|---|---|---|---|
| Profax 6823 | 99.7 | 99.7 | 99.7 | 99.7 | 99.7 | 99.7 | 99.7 | 99.7 |
| Irganox 1010 | 0.3 | 0.075 | — | — | — | — | — | — |
| Dilauryl Thiodipropionate | — | 0.225 | — | — | — | 0.225 | 0.225 | 0.225 |
| Sample 52 | — | — | 0.3 | — | — | 0.075 | — | — |
| Sample 53 | — | — | — | 0.3 | — | — | 0.075 | — |
| Sample 55 | — | — | — | — | 0.3 | — | — | 0.075 |
| | Average ultimate elongation (at 2''/min.) following heat aging at 150° C, % | | | | | | | |
| Original | 500–530% | | | | | | | |
| 4 weeks | 267 | 355 | 450 | 320 | 210 | — | 210 | — |
| 5 weeks | 225 | 333 | 367 | 330 | — | 450 | 170 | — |
| 6 weeks | 180 | 320 | 350 | — | — | 390 | — | 290 |

TABLE XI-continued

|  | 1 | 2 | 3 | 4 | 5 | 6 | 7 | 8 |
|---|---|---|---|---|---|---|---|---|
| 7 weeks | — | 250 | — | — | — | 243 | 100 | 300 |

TABLE XII

| Samples irradiated to 25 mrads | 1 | 2 | 3 | 4 | 5 |
|---|---|---|---|---|---|
| DFD 6040 | 95 | 95 | 95 | 95 | 95 |
| Triallyl Isocyanurate | 3 | 3 | 3 | 3 | 3 |
| Irganox 1010 | 2 | — | — | — | — |
| Distearyl pentaerythritol diphosphite | — | 1 | 1 | 1 | 1 |
| Sample 52 | — | — | 1 | — | — |
| Sample 53 | — | — | — | 1 | — |
| Sample 55 | — | — | — | — | 1 |
| M100 at 160° C, psi | 91 | 36.5 | 83 | 85 | 86 |

Average elongation (at 2"/min.) after heat aging at 175° C, %
Original >500%

| | | | | | |
|---|---|---|---|---|---|
| 1 day | 310 | 447 | 333 | 253 | 310 |
| 2 days | 277 | 420 | 320 | 177 | 282 |
| 4 days | 140–280 | 367 | 283 | <20 | 270 |
| 7 days | <20 | <20 | 30–200 | <20 | 293 |

The above examples are not to be construed as limiting but merely illustrative of the scope of the present invention. Thus, it can be seen that the antioxidants of the present invention can be formed from a wide variety of bisphenol materials. The antioxidants are generally effective in all polymers, particularly those which are known to be stabilized by hindered phenols, and they can be incorporated in such polymers by conventional methods such as hot milling, mixing in a Banbury mixer, extrusion, etc.

I claim:

1. A polymer composition comprising a normally oxidizable polymer and an effective antioxidant amount of an antioxidant composition comprising a mixture of bisphenolic polymers of the formula H —[-Z—Y—X—]$_n$ H wherein $n$ is an integer of from 2 to about 12 and wherein Y is independently chosen from the group consisting of sulfur, methylene and butylidene, and for each bisphenolic repeating unit —Z—Y—X— Z and X are independently selected from the group consisting of

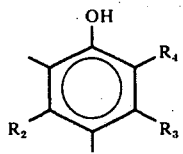 and 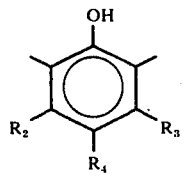

$R_2$ and $R_3$ being independently selected from the group consisting of hydrogen and alkyl, cycloalkyl, aryl and alkaryl groups having from 1 to 8 carbon atoms, $R_4$ being an alkyl group of from 4 to 8 carbon atoms.

2. A polymer composition according to claim 1 wherein each Z and X moiety is

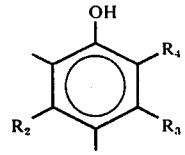

3. A polymer composition according to claim 1 wherein $R_2$ is methyl, $R_3$ is hydrogen and $R_4$ is t-butyl.

4. A polymer composition according to claim 1 wherein the antioxidant is present in an amount up to about 10 parts by weight per 100 parts by weight of the normally oxidizable polymer.

5. A polymer composition according to claim 4 wherein the amount of antioxidant is 1–10 parts by weight.

6. A polymer composition according to claim 4 wherein the antioxidant is present in an amount up to about 1 part by weight per 100 parts by weight of the normally oxidizable polymer.

7. A polymer composition according to claim 6 wherein the amount of antioxidant is from about 0.25 to about 1 part by weight.

8. A polymer composition according to claim 1 wherein the normally oxidizable polymer is a polyolefin.

9. A polymer composition according to claim 8 wherein the polyolefin is selected from polyethylene or polypropylene.

10. A polymer composition according to claim 2 wherein $n$ is from about 2 to about 4.

11. A polymer composition according to claim 10 wherein $R_2$ is methyl, $R_3$ is hydrogen, $R_4$ is t-butyl and Y is sulfur or butylidene.

12. A polymer composition according to claim 1 wherein average $n$ for the mixture is from about 2 to about 10.

13. A polymer composition according to claim 12 wherein average $n$ is from about 2 to about 7.

14. A polymer composition according to claim 13 wherein average $n$ is from about 2 to about 4.

15. A polymer composition according to claim 1 wherein the bisphenolic polymers have the formula

[structure: bisphenolic repeating unit with OH, t-C$_4$H$_9$, CH$_3$ substituents, bridged by Y, subscript n]

wherein Y is selected from the group consisting of sulfur and butylidene.

16. A polymer composition according to claim 15 wherein average $n$ is from about 2 to about 10.

17. A polymer composition according to claim 16 wherein average $n$ is from about 2 to about 7.

18. A polymer composition according to claim 17 wherein Y is sulfur.

19. A polymer composition according to claim 17 wherein Y is butylidene.

20. A polymer composition according to claim 17 wherein average $n$ is from about 2 to about 4.

21. A polymer composition according to claim 4 wherein the bisphenolic polymers have the formula

[structure: bisphenolic repeating unit with OH, t-C$_4$H$_9$, CH$_3$ substituents, bridged by Y, subscript n]

wherein Y is selected from the group consisting of sulfur and butylidene.

22. An antioxidant composition according to claim 21 wherein Y is sulfur.

23. An antioxidant composition according to claim 21 wherein Y is butylidene.

24. A process for inhibiting the oxidation of a normally oxidizable polymer comprising admixing with the polymer an effective antioxidant amount of an antioxidant composition comprising a mixture of bisphenolic polymers of the formula H [—Z—Y—Z—]$_n$ H wherein $n$ is an integer of from 2 to about 12 and wherein Y is independently chosen from the group consisting of sulfur, methylene and butylidene, and for each bisphenolic repeating unit —Z—Y—X—, Z and X are independently selected from the group consisting of

[two phenolic structures: OH with R$_2$, R$_3$, R$_4$ substituents, and OH with R$_4$, R$_2$, R$_3$ substituents] and ;

R$_2$ and R$_3$ being independently selected from the group consisting of hydrogen and alkyl, cycloalkyl, aryl and alkaryl groups having from 1 to 8 carbon atoms, R$_4$ being an alkyl group of from 4 to 8 carbon atoms.

25. A process according to claim 24 wherein each Z and X moiety is

[phenolic structure: OH with R$_4$, R$_3$, R$_2$ substituents]

26. A process according to claim 24 wherein R$_2$ is methyl, R$_3$ is hydrogen and R$_4$ is t-butyl.

27. A process according to claim 25 wherein the antioxidant is admixed in an amount up to about 10 parts by weight per 100 parts by weight of the normally oxidizable polymer.

28. A process according to claim 27 wherein the amount of antioxidant is 1–10 parts by weight.

29. A process according to claim 27 wherein the antioxidant is present in an amount up to about 1 part by weight per 100 parts by weight of the normally oxidizable polymer.

30. A process according to claim 29 wherein the amount of antioxidant is from about 0.25 to about 1 part by weight.

31. A process according to claim 25 wherein the normally oxidizable polymer is a polyolefin.

32. A process according to claim 31 wherein the polyolefin is selected from polyethylene or polypropylene.

33. A process according to claim 26 wherein $n$ is 2–4.

34. A process according to claim 33 wherein R$_2$ is methyl, R$_3$ is hydrogen, R$_4$ is t-butyl and Y is sulfur or butylidene.

35. A process according to claim 24 wherein the admixture of the antioxidant into the normally oxidizable polymer is accomplished by an in situ polymerization of the antioxidant monomer precursor initiated by an organic peroxide.

36. A process according to claim 24 wherein average $n$ for the mixture is from about 2 to about 10.

37. A process according to claim 36 wherein average $n$ is from about 2 to about 7.

38. A process according to claim 37 wherein average $n$ is from about 2 to about 4.

39. A process according to claim 24 wherein the bisphenolic polymers have the formula

[structure: bisphenolic repeating unit with OH, t-C$_4$H$_9$, CH$_3$ substituents, bridged by Y, subscript n]

wherein Y is selected from the group consisting of sulfur and butylidene.

40. A process according to claim 39 wherein average n is from about 2 to about 10.

41. A process according to claim 40 wherein average n is from about 2 to about 7.

42. A process according to claim 41 wherein Y is sulfur.

43. A process according to claim 41 wherein Y is butylidene.

44. A process according to claim 41 wherein average n is from about 2 to about 4.

45. A process according to claim 27 wherein the bisphenolic polymers have the formula

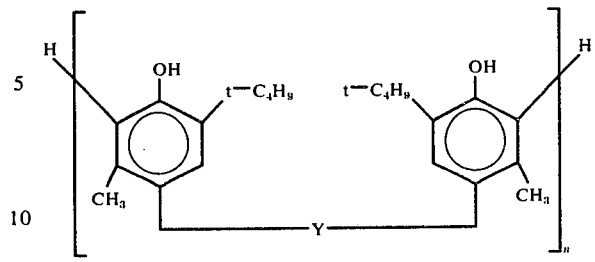

wherein Y is selected from the group consisting of sulfur and butylidene.

46. A process according to claim 45 wherein Y is sulfur.

47. A process according to claim 45 wherein Y is butylidene.

* * * * *